E. A. EMERY.
TRIPOD FOR SUPPORTING LIGHTING FIXTURES.
APPLICATION FILED AUG. 26, 1907.
901,795.
Patented Oct. 20, 1908.
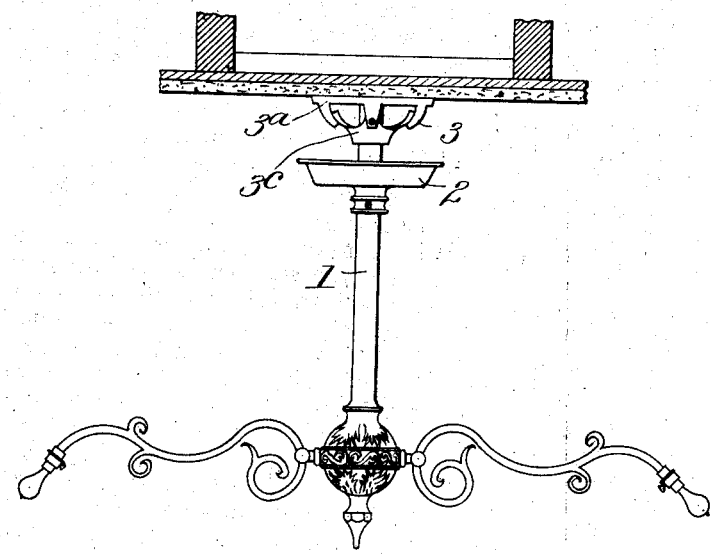
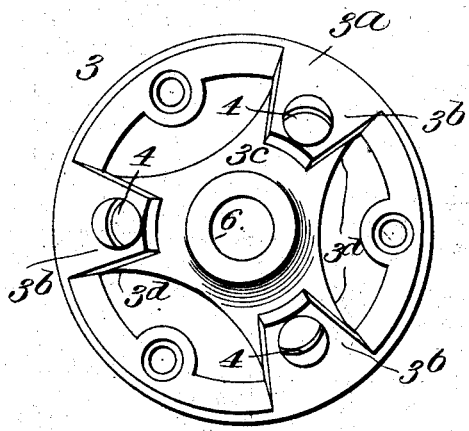
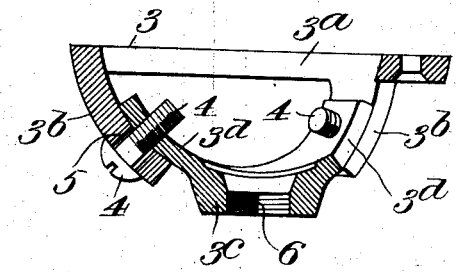
Witnesses
Inventor
Edwin A. Emery,
By Edson Bros,
Attorneys

UNITED STATES PATENT OFFICE.

EDWIN A. EMERY, OF GALVA, ILLINOIS.

TRIPOD FOR SUPPORTING LIGHTING-FIXTURES.

No. 901,795.

Specification of Letters Patent.

Patented Oct. 20, 1908.

Application filed August 26, 1907. Serial No. 390,201.

*To all whom it may concern:*

Be it known that I, EDWIN A. EMERY, a citizen of the United States, residing at Galva, in the county of Henry and State of Illinois, have invented certain new and useful Improvements in Tripods for Supporting Lighting-Fixtures; and I do hereby declare the following to be a full, clear, and exact description of the invention, such as will enable others skilled in the art to which it appertains to make and use the same.

My invention relates to tripods for supporting electric light or other fixtures.

It has for its object to lessen the labor of hanging such fixtures and to provide for the ready adjustment thereof so that they will hang plumb.

The invention consists in the features of construction and combinations of parts hereinafter described and specified in the claims.

In the accompanying drawings, illustrating the preferred embodiment of my invention: Figure 1 is an elevation of an electrolier or chandelier secured to a ceiling by one of my tripods, the canopy being withdrawn to reveal the tripod. Fig. 2 is a detailed plan view of the tripod, and Fig. 3 is a central sectional view thereof.

Referring more particularly to the drawings, 1 designates the stem of the electrolier and 2 the canopy for covering the tripod 3. Said tripod is made in two parts, one comprising a plate 3ª having curved arms 3ᵇ converging towards each other and the other consisting of a smaller plate 3ᶜ having curved diverging arms 3ᵈ spaced similarly to the arms of the first part. The arms 3ᵈ normally engage the inner faces of the arms 3ᵇ and are secured thereto by screws 4. The passages 5 for said screws in the arms 3ᵇ are larger than the shanks of the screws for the purpose of adjustment. The plate 3ᶜ has a screw threaded passage 6 through it to receive the stem of the electrolier.

Practice has shown that when a fixture is secured to a plastered ceiling it will nearly always be out of plumb owing to unevenness in the surface of the plaster. When the ordinary one piece tripod is used the only way to remedy this is to loosen the screws holding the tripod to the ceiling and wedge it down with washers or pieces of cardboard or other material. This requires time and at best gives only a botch job when finished. When my tripod is used, as soon as the fixture is secured to the ceiling, the adjusting screws 4 may be loosened to permit the fixture to plumb itself or be plumbed, after which said screws may be tightened, making a good firm job.

If desired, the upper or main part of the tripod may be screwed to the ceiling or wall first and the electrolier or bracket having the smaller part of the tripod screwed upon it, may have its arms inserted between those of the main part and turned until the screws 4 can be put in and tightened. This also makes it convenient if the fixture has to be taken down for repairs as none of the screws that hold it to the ceiling have to be disturbed.

I have noticed with the old style tripod that the wiremen fasten the fixture to it before installing it. When this is done the starting of the screws through the plaster will cause said plaster to crumble and fall down within the canopy which has been dropped down on the stem, as illustrated for instance in Fig. 1, to permit access to said screws. Then, when the canopy is slipped up into place, the plaster will lodge between said canopy and stem and scratch the casing of the latter, removing the lacquer and causing it soon to tarnish. By employing my tripod and screwing the upper or main part on first this can be avoided. Of course the old style of tripod can be put up first but in screwing the stem of the fixture into it at least six turns are required and the wires in said stem are liable to become short circuited.

I claim:

1. A tripod for the purpose specified comprising an upper and a lower plate, said upper plate having a plurality of curved converging arms, the lower plate having a like number of similarly curved diverging arms, the arms of the lower plate being arranged above and supported upon the arms of the upper plate, and means to adjustably secure the corresponding arms of said plates together.

2. A tripod for the purpose specified comprising an upper and a lower plate, said upper plate having three curved converging arms, the lower plate having a like number arms of similarly curved diverging arms, the arms of the lower plate being arranged above and of the lower plate being arranged above and supported upon the arms of the upper plate, and means to adjustably secure the corresponding arms of said plates together.

3. A tripod for the purpose specified comprising an upper and a lower plate, said upper plate having a plurality of curved converging arms provided with enlarged openings therein, the lower plate having a like number of similarly curved diverging arms, the arms of the lower plate being arranged above and supported upon the arms of the upper plate, and screws passed through said enlarged openings in the lower arms and engaged with the upper arms.

4. A tripod for the purpose specified, comprising an upper and a lower plate, said upper plate having a plurality of curved converging arms, the lower plate having a like number of similarly curved diverging arms, the arms of the lower plate being arranged above and supported upon the arms of the upper plate, the spaces between the arms on the upper plate being wider than the arms on the lower plate whereby said plates may be disconnected, and means to adjustably secure the corresponding arms of said plates together.

In testimony whereof, I affix my signature, in presence of two witnesses.

EDWIN A. EMERY.

Witnesses:
  W. S. McCLINTOCK,
  RAY L. PALMER.